July 7, 1942.    G. M. BROWN    2,289,283
FUEL FEED TIMING DEVICE
Filed Dec. 27, 1937
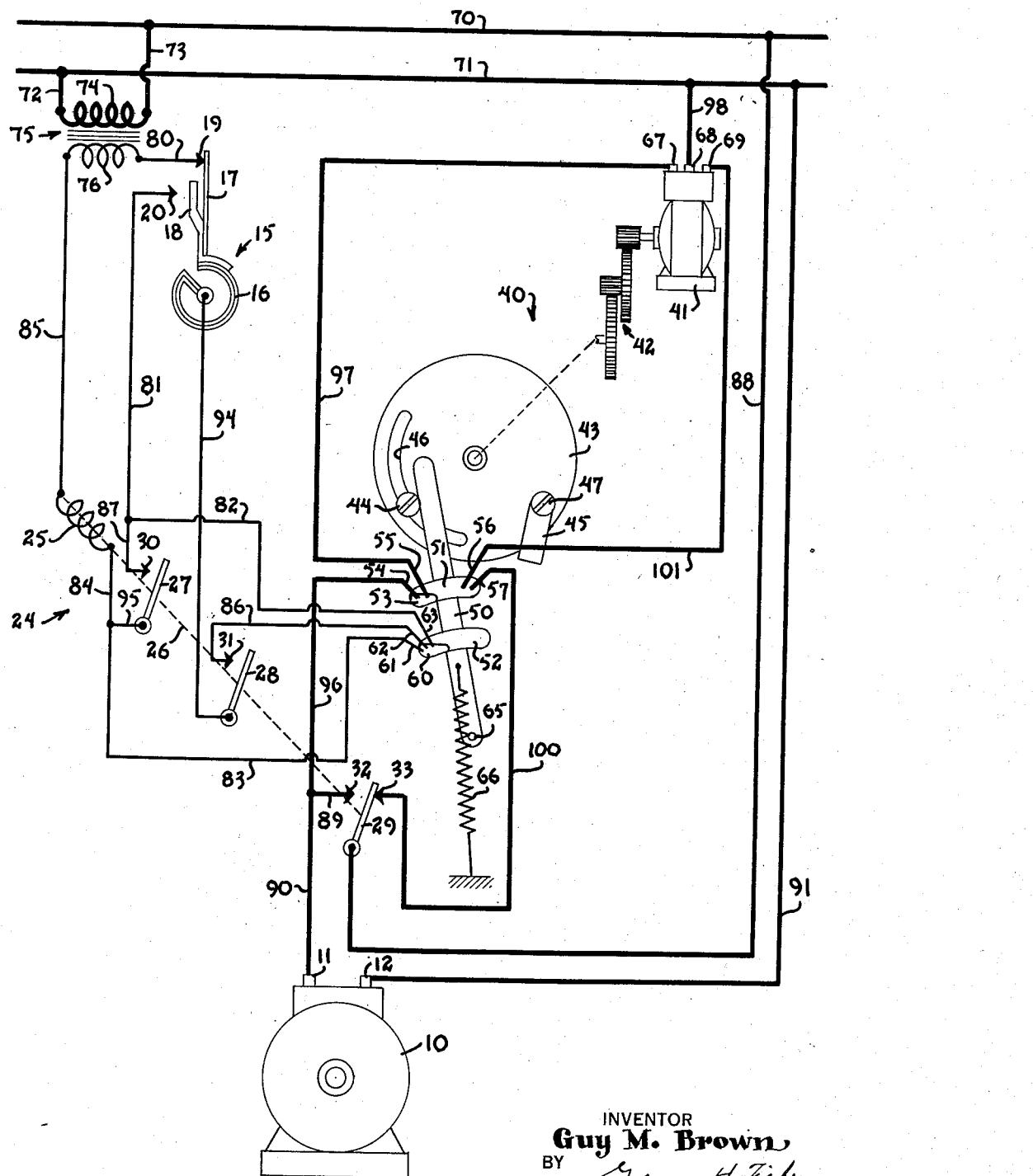
INVENTOR
Guy M. Brown
BY
George H Fisher
ATTORNEY Patented July 7, 1942

2,289,283

UNITED STATES PATENT OFFICE 2,289,283

FUEL FEED TIMING DEVICE

Guy M. Brown, Minneapolis, Minn., assignor to Minneapolis-Honeywell Regulator Company, Minneapolis, Minn., a corporation of Delaware Application December 27, 1937, Serial No. 181,955

14 Claims. (Cl. 236—46)

This invention relates to a heating system and more particularly to a system for controlling the feeding of fuel to a furnace or the like.

In the operation of a heating system wherein coal or oil is used as a fuel, it is common to control an oil burner or a stoker in accordance with the temperature of the space being heated. In order to secure the best results, the fuel feeding device should not operate at too short and frequent intervals, and one method of insuring against this is to provide a thermostat having a definite operating differential of 2°, for exammple, so that the thermostat will cause the operation of the fuel feeding means at 68°, for example, and will not stop the operation until the temperature reaches 70°.

In my system, I utilize a thermostat having a set of contacts which normally control the operation of the fuel feeding means, and provide a timing means which insures that the fuel feeding means will operate at least for a certain time after the operation has been started by the thermostat, but control thereof is returned to the thermostat as soon as this time expires. As soon as the operation of the fuel feeding means is stopped after this time by reason of the thermostat becoming satisfied, the timer prevents subsequent operation of the fuel feeding means until the elapse of a predetermined time. Thus, by controlling the fuel feeding means by a single pair of thermostat contacts, a minimum period of operation of the fuel feeding means is assured every time there is a call for heat, and a minimum shut-down period is assured after the thermostat becomes satisfied.

An extra set of thermostat contacts may be provided to shut down the fuel feeding means immediately should the temperature in the space being heated at any time attain an excessive value, these contacts normaly remaining in such a position that the fuel feeding means is controlled solely by the first mentioned pair of contacts and the timing means.

It is therefore an object of my invention to provide in a heating system, an improved control system for a fuel feeding means.

More specifically, it is an object of my invention to provide a control system for a fuel feeding means wherein the fuel feeding means is normally under the control of a single set of thermostat contacts and wherein minimum off and on periods of operation of the fuel feeding means are assured whereby short cycling of the fuel feeding means is prevented.

Other objects will become apparent upon reading the supecification and claims in conjunction with the drawing wherein is illustrated diagrammatically a preferred form of the invention.

Referring more specifically to the drawing, a motor 10 is illustrated which motor may be connected to any suitable fuel feeding device such as coal stoker or oil burner, for example. Motor 10 is provided with terminals 11 and 12 for connection to a suitable source of power.

A thermostat generally represented by the reference character 15 may be provided for controlling the operation of the motor 10. This thermostat may comprise a bimetallic element 16, contact arms 17 and 18 cooperating with fixed contacts 19 and 20, respectively. Contact arm 17 in the normal operation of the system will be in engagement with contact 19, as illustrated, this contact arm being flexible and permitting arm 18 to move into engagement with contact 20 when the temperature in the space being heated falls to a predetermined value. The only time arm 17 will move out of engagement with contact 19 will be when the temperature in the space reaches an excessive value.

Controlled by the thermostat 15 is a relay generally designated by the reference character 24. This relay comprises a relay coil 25, an armature 26 to which are connected blades 27, 28, and 29. Fixed contacts 30, 31, and 32 cooperate with the arms 27, 28, and 29, respectively, these arms being moved into engagement with the respective contacts when the coil 25 is energized. Upon deenergization of the coil 25, the arms move out of engagement with their respective contacts and arm 29 moves into engagement with a fixed contact 33.

A timing device is represented by the reference character 40, this timing device including a reversible motor 41 connected by means of reduction gearing 42 to a timing disc 43. Connected to the timing disc are suitable stops 44 and 45, stop 44 being adjustably mounted in a slot 46, and stop 45 being adjustably connected to the disc 43 by means of a bolt 47. Operated by the timing disc is an arm 50 carrying switch members 51 and 52. Switch member 51 may include a mercury element 53 and terminals 54, 55, 56, and 57. Switch 52 may include a mercury element 60 and terminals 61, 62, and 63. Arm 50 is pivotally mounted at 65 and is caused to rotate about its pivot upon rotation of the timing disc 43. A spring 66 suitably connected to the arm 50 causes the arm 50 to move with a snap action as will be apparent from the drawing.

Motor 41 may be provided with terminals 67, 68, and 69.

Power may be supplied to the various operating elements by means of lines 70 and 71 connected to a suitable source of power (not shown). Connected across the lines 70 and 71 by means of conductors 72 and 73 is a primary 74 of a step-down transformer. This transformer also includes a core 75 and a secondary 76.

Operation

In the normal operation of the system arm 17 of thermostat 15 will remain in engagement with contact 19. When the temperature in the space being heated drops to a predetermined value arm 18 of the thermostat moves into engagement with contact 20 and causes relay coil 25 of the relay 24 to be energized through the following circuit: from one side of the secondary 76 of the step-down transformer through conductor 80, contact 19, arms 17 and 18 of thermostat 15, contact 20, conductors 81 and 82, contact 63 of mercury switch 52, through the mercury 60 to contact 61, conductors 83, 84 through the relay coil 25 and conductor 85 to the other side of secondary 76. Energization of relay coil 25 causes blades 27, 28, and 29 to move into engagement with contacts 30, 31, and 32, respectively. Engagement of blade 29 with contact 32 causes the motor 10 to be energized through the following circuit: from line 70 through conductor 88, blade 29, contact 32, conductors 89, 90, terminal 11 of motor 10 through the motor to terminal 12 and conductor 91 to the line 71. Operation of motor 10 causes fuel to be supplied to the furnace whereupon the space temperature will begin to rise.

In order that the motor 10 operate for a predetermined minimum length of time even though arm 18 of thermostat 15 should move away from contact 20 soon after it has moved into engagement therewith, the motor 10 is caused to operate by means of the timer 40. As soon as relay coil 25 is energized by the engagement of arm 18 and contact 20, a holding circuit is established through the relay coil 25, this circuit being as follows: from transformer secondary 76 through conductor 80, contact 19, arm 17, bimetallic element 16, conductor 94, blade 28, contact 31, conductor 86, contact 62, mercury element 60, contact 61, conductors 83 and 84, relay coil 25, and conductor 85 to the other side of secondary 76. It will therefore be seen that the relay coil 25 will remain energized as long as mercury switch 52 is in a position to close a circuit from contact 62 to 61 and as long as the arm 17 of thermostat 15 remains in engagement with contact 19. As previously stated, arm 17 is so arranged that it will not move away from contact 19 unless the temperature in the space should reach an excessively high value which will not ordinarily take place.

Motor 41 of timer 40 is also energized by reason of the energization of relay 24, the circuit through this motor being as follows: from line 70 through conductor 88, blade 29, contact 32, conductors 89, 96, contact 54, mercury element 53, contact 55, conductor 97, terminal 67 of motor 41 through the motor to terminal 68, and conductor 98 to the line 71. Connection of terminals 67 and 68 of the motor 41 to the lines 70 and 71 cause the motor to start rotating in a direction to rotate the timing disc 43 in a counter-clockwise direction. This operation of the motor will continue as long as relay 24 remains energized and as long as switch 51 remains in a position to close contacts 54 and 55 by the mercury element 53. Rotation of timing disc 43 in a counterclockwise direction causes the stop 44 to move the arm 50 about its pivot 65 in a clockwise direction and this movement will continue until the arm 50 has attained such a position that spring 66 causes the arm to snap past dead center and into engagement with the stop 45. Upon the arm 50 snapping into engagement with stop 45, the mercury elements 53 and 60 in switches 51 and 52 move to the other end of the switches. By reason of this, the circuit through contacts 54 and 55 of switch 51 is broken whereupon the motor 41 stops rotating. Also, the contacts 61, 62, and 63 are no longer connected together by means of the mercury element 60. The motor 10 is now solely under the control of the room thermostat 15 and if at the end of this timing period, arm 18 of the thermostat still remains in engagement with contact 20, the relay 24 will remain energized, and the motor 10 will continue to operate, there being a holding circuit through relay coil 25 as follows: from secondary 76, through conductor 80, contact 19, arms 17 and 18, contact 20, conductors 81, 87, contact 30, blade 27, conductors 95, 84, coil 25 and conductor 85 to the other side of secondary 76. After the temperature in the space being heated rises to such a value that arm 18 moves out of engagement with contact 20, relay 25 becomes deenergized and since the circuit through motor 10 is dependent upon engagement of blade 29 with contact 32, the motor 10 will stop operating.

Engagement of blade 29 with contact 33 will cause the motor 41 to again start rotating in the opposite direction by reason of the connection of terminals 68 and 69 to the source of power, the circuit through this motor now being as follows: from the line 70 through conductor 88, blade 29, contact 33, conductor 100, contact 57, mercury element 53, contact 56, conductor 101, terminals 69 and 68 of motor 41 and conductor 98 to the line 71. Motor 41 now starts rotating in a direction to move the timing disc 43 in a clockwise direction whereupon the adjustable stop 45 causes arm 50 to move to the left about pivot 65. During the time that switch 52 is tilted in the position in which the contacts 61, 62, and 63 are no longer electrically connected by means of the mercury 60, a circuit through the relay coil 25 cannot be established should the arm 18 of thermostat 15 move into engagement with contact 20. Thus, until the switch 52 is tilted back to the position shown, motor 10 cannot be operated. Upon the elapse of a timed interval, stop 45 will have moved arm 50 sufficiently to the left so that it will snap into engagement with stop 44 and switches 51 and 52 will resume the positions illustrated. If the thermostat 15 is in the position illustrated, motor 41 will come to rest and motor 10 will remain deenergized until there is another call for heat by the thermostat 15.

The length of the on and off periods of motor 10 are varied by stops 44 and 45. The length of the on period is determined by the distance between 44 and 47, since arm 50 strikes 47 when it snaps to its opposite position. However, upon the return movement, arm 50 will be engaged by the extremity of arm 45, so that the off period of the motor will be determined by the distance between stop 44 and the extremity of arm 45. Accordingly, adjustment of stop 44 adjusts both the on and off periods of the motor, and adjustment of stop 45 adjusts the off period only. In this manner, the lengths of the on and off periods may each be adjusted as desired. These periods will be so chosen that too frequent and short periods of operation of motor 10 will be prevented even though contact 18 of the thermostat 15 should move into and out of engagement with contact 20 at frequent intervals.

If for any reason during the on period of the motor 10 and while the timing disc is moving arm 50 towards its extreme right position the temperature in the space being heated should attain an excessively high value, it would be undesirable to continue operation of the stoker for the remainder of the minimum timed period and movement of arm 17 of thermostat 15 out of engagement with the contact 19 will immediately deenergize the relay 24 and stop the operation of motor 10. Should this happen, it will be apparent that motor 10 will not be reenergized until the space temperature drops to such a point that both arms 17 and 18 of thermostat 15 move into engagement with contacts 19 and 20.

It will thus be seen that I have devised a system for operating a fuel feeding device wherein a single set of thermostat contacts normally control the operation of the fuel feeding device and wherein the fuel feeding device is operated at least for a minimum predetermined period of time once it has been started by the thermostat, and after the operation thereof has been stopped, the subsequent operation thereof will be prevented until the expiration of another minimum period of time.

While I have illustrated a preferred form of my invention, it will be understood that many changes will be apparent to those skilled in the art and I wish it to be understood that my invention is limited only by the scope of the appended claims.

I claim as my invention:

1. In a system of the class described, condition changing means, condition responsive means, means under the control of the condition responsive means for causing operation of the condition changing means in response to the attainment of a predetermined condition, control means movable between first and second positions, means responsive to the attainment of the predetermined condition for causing movement of the control means from the first to the second position, means for normally insuring continued operation of the condition changing means while the control means is moving from the first to the second position, means under the control of the condition responsive means for stopping operation of the condition changing means and for causing movement of the control means from the second to the first position upon the attainment of a second predetermined condition, and means for preventing further operation of the condition changing means until the control means is moved back to its first position.

2. In a system of the class described, condition changing means, condition responsive means including circuit controlling means, a second circuit controlling means, a motor for moving said second circuit controlling means between first and second circuit controlling positions, means responsive to movement of said first named circuit controlling means to circuit closing position by the condition responsive means for causing operation of the condition changing means and for causing energization of said motor, means for normally insuring continued operation of the condition changing means as long as the second named circuit controlling means is in the first circuit controlling position after the first named circuit controlling means has moved to circuit closing position, means responsive to movement of said first named circuit controlling means to circuit opening position for interrupting operation of the condition changing means after the second circuit controlling means has moved to the second circuit controlling position and for causing operation of said motor to cause the second circuit controlling means to move back to the first circuit controlling position, and means for preventing subsequent operation of the condition changing means until the second circuit controlling means is moved back to first circuit controlling position.

3. In a system of the class described, a controller including switch means, condition responsive means, means responsive to movement of said condition responsive means to a first position for causing movement of said switch means from a first to a second position, means responsive to movement of the condition responsive means to a second position for causing movement of the switch means from the second to the first position, condition changing means, means for causing operation of the condition changing means upon movement of the condition responsive means to the first position, means for creating a circuit through said condition changing means and said switch means independent of said condition responsive means after movement thereof to the first position whereby the condition changing means will continue to operate independently of the condition responsive means until the switch means has moved to the second position, means for deenergizing the condition changing means upon movement of the switch means to the second position and movement of the condition responsive means to the second position, and circuit means whereby subsequent operation of the condition changing means is dependent upon movement of both the switch means and the condition responsive means back to the first positions.

4. In a system of the class described, in combination, condition changing means, condition responsive means, means whereby operation of said condition changing means is initiated in response to a predetermined value of the condition affecting said condition responsive means, control means for normally causing continued operation of said condition changing means for a predetermined period of time after initiation of operation thereof, and means for terminating operation of said condition changing means prior to the expiration of said predetermined period of time in the event of said condition attaining a predetermined value different from the value at which operation was initiated, said control means embodying mechanism operative to prevent reinitiation of operation of said condition changing means for a predetermined period of time after termination of operation thereof.

5. In a control system, in combination, fuel supply means, thermostatic means, and timing means, said thermostatic means and timing means controlling said fuel supply means and being so cooperatively arranged that said timing means starts a timing period upon starting of the fuel supply means and upon stopping of the fuel supply means, means whereby operation of the fuel supply means normally continues during a timed period at least after starting, and is prevented for a timed period after stopping, and means whereby said thermostatic means is operable to start the fuel supply means after said last mentioned timed period irrespective of time.

6. In combination with a condition changing means, control means comprising a thermostat and a timing device, said control means being operable to govern the cycles of operation of the condition changing means, said timing means cooperating in the control of the condition changing means whereby a substantial interval of time must elapse between successive operating cycles of the condition changing means, said timing device including means whereby after the expiration of said interval of time the timing device assumes a status wherein the control means can thereafter start the condition changing means at any time responsively to the thermostat.

7. In apparatus of the character described, in combination, fuel feeding means, control means comprising a thermostatic means and timing means, said thermostatic means and timing means being cooperable to start the fuel feeding means when the timing means is in a predetermined position, said timing means then moving to a different position, means whereby after starting, the thermostatic means can keep the fuel feeding means in operation independently of the timing means until the thermostatic means is satisfied, and means whereby upon the thermostatic means becoming satisfied the timing means begins a timing period at the expiration of which the timing means assumes a status wherein the thermostatic means and timing means are again cooperable to start the fuel feeding means.

8. In combination, a stoker, control means comprising a thermostat and a timer, means whereby the thermostat can simultaneously start the stoker and cause the timer to operate to begin a timing period, dependently upon the position of the timer, means whereby after the stoker is started normally it is continued in operation under control of the timer for at least a predetermined period, means whereby the stoker may be continued in operation beyond said predetermined period after it has once started and as long as said thermostat remains unsatisfied, means whereby said timer stops at the expiration of said predetermined period, means whereby after the expiration of said period, if or when said thermostat is satisfied, said timer restarts and begins a new timing period, said timer assuming a position at the expiration of said new period wherein said thermostat is again effective to start the stoker.

9. In a system of the character described, in combination, condition changing means, control apparatus comprising condition responsive means having first and second pairs of electrical contacts engageable at different temperatures, relay means, timing means having contacts controlling said relay means, circuit means whereby engagement of said first pair of contacts energizes said relay through said timing contacts, said relay having contacts and having circuit means associated therewith for forming a maintaining circuit for said relay through each of said first and second pairs of contacts, the maintaining circuit through said second pair of contacts extending through said timing contacts, said control apparatus and timing contacts controlling said timing means so as to start a timing period upon energization of the relay and said timing means being operable to actuate its contacts to interrupt the original energizing circuit of the relay, and to terminate said timing period.

10. In a system of the character described, in combination, condition changing means, control apparatus comprising condition responsive means having first and second pairs of electrical contacts engageable at different temperatures, relay means, timing means having contacts controlling said relay means, circuit means whereby engagement of said first pair of contacts energizes said relay through said timing contacts, said relay having contacts and having circuit means associated therewith for forming a maintaining circuit for said relay through each of said first and second pairs of contacts, the maintaining circuit through said second pair of contacts extending through said timing contacts, said control apparatus and timing contacts controlling said timing means so as to start a timing period upon energization of the relay and said timing means being operable to actuate its contacts to interrupt the original energizing circuit of the relay, and the maintaining circuit through said second pair of contacts and to terminate said timing period.

11. In a system of the character described, in combination, condition changing means, control apparatus comprising condition responsive means having first and second pairs of electrical contacts engageable at different temperatures, relay means, timing means having contacts controlling said relay means, circuit means whereby engagement of said first pair of contacts energizes said relay through said timing contacts, said relay having contacts and having circuit means associated therewith for forming a maintaining circuit for said relay through each of said first and second pairs of contacts, the maintaining circuit through said second pair of contacts extending through said timing contacts, said control apparatus and timing contacts controlling said timing means so as to start a timing period upon energization of the relay and said timing means being operable to actuate its contacts to interrupt the original energizing circuit of the relay, and to terminate said timing period, and circuit means associated with said timing contacts and relay to start a new tming period whenever said relay is deenergized, said timing means operating its contacts to render the original circuit for the relay re-energizable after said new timing period.

12. In a system of the class described, in combination, condition changing means, condition responsive means, means whereby operation of said condition changing means is initiated in response to a predetermined value of the condition affecting said condition responsive means, control means for normally causing continued operation of said condition changing means for a predetermined period of time after initiation of operation thereof, and means for terminating operation of said condition changing means in response to said condition responsive means after said period of time, said control means embodying mechanism operative to prevent reinitiation of operation of said condition changing means for a predetermined period of time after termination of operation thereof.

13. In apparatus of the character described, in combination, temperature changing means, control means comprising a thermostat having first and second pairs of sequentially engageable contacts, a relay controlled by said thermostat controlling said first means, circuit means for energizing said relay when the last to close of said pairs of contacts are engaged, means forming a maintaining circuit for said relay including the other pair of said contacts, and timing means controlling said maintaining circuit and arranged to interrupt it at a predetermined time after the relay is energized.

14. In apparatus of the character described, in combination, temperature changing means, control means comprising a thermostat having first and second pairs of sequentially engageable contacts, a relay controlled by said thermostat controlling said first means, circuit means for energizing said relay when the last to close of said pairs of contacts are engaged, means forming a maintaining circuit for said relay including the other pair of said contacts, and timing means controlling said maintaining circuit and arranged to interrupt it at a predetermined time after the relay is energized, said circuit means and the last to close of said contacts being arranged so as to be operable to keep said relay energized after the expiration of said predetermined time, and said thermostat being operable to interrupt the relay energizing and maintaining circuits within said predetermined time.

GUY M. BROWN.